3,396,638
PROCESS AND APPARATUS FOR THE MANUFACTURE OF MULTI-PLY BAGS
John G. Lepisto, Middletown, Ohio, assignor to Albemarle Paper Company, Richmond, Va., a corporation of Virginia
Filed Sept. 28, 1966, Ser. No. 582,690
10 Claims. (Cl. 93—20)

This invention relates to a process and apparatus for the manufacture of multi-ply bags. More specifically, the invention relates to a process and apparatus for the manufacture of gusseted multi-ply bags having a gusseted thermoplastic inner ply.

In my co-pending patent applications Ser. No. 454,903 filed May 11, 1965, now Patent No. 3,291,375, issued December 13, 1966 and Ser. No. 558,182 filed Apr. 28, 1966 (which application is a division of Ser. No. 454,903) there is disclosed a novel multi-ply bag, a process and apparatus for its manufacture. In the foregoing applications the novel multi-ply gusseted bag is fabricated by enveloping a thin wall tube of plastic material with one or more paper plies and severing the thus formed nested tube into bag lengths. The bag lengths are then closed on one end and the plastic inner liner may be heat sealed if desired. The apparatus utilized in carrying out the process disclosed in the afortmentioned patent applications utilizes a hollow mandrel through which an inflated portion of the plastic tube is passed to form the tube into the contour of the finished gusseted bag. The outer paper plies are infolded over this mandrel and mate with the plastic tube as it leaves the toe of the mandrel. The mandrel disclosed in the aforementioned patent applications was constructed from sheet metal and had a fixed length and width whereby only one width multiwall bag could be produced on any specific mandrel. Since an ordinary tubing machine is used to produce multi-wall bags of various widths this necessitated having on hand a large number of fixed width mandrels in order to produce multi-wall bags having different widths.

In addition the mandrel used in forming the multi-wall bags according to the apparatus disclosed in the aforementioned patent applications required that the inflated plastic inner liner contact the entire interior surface of the mandrel as it passed therethrough. Since it is desirable to minimize frictionable forces generated from sliding contact of the plastic inner liner with any portion of the tubing apparatus it has been found desirable to reduce as much as possible the area of the mandrel which contacts the inflated plastic tube.

It is an object of this invention to provide an apparatus for producing a gusseted multi-ply bag having a plastic inner liner which apparatus has an adjustable mandrel permitting production of various width bags.

A further object of this invention is to provide a process for producing a gusseted multi-ply bag with a plastic inner liner which process minimizes contact of the plastic inner ply with the apparatus used in producing the bag.

A further object of this invention is to provide an apparatus for producing a gusseted multi-ply bag which can be quickly adjusted to permit production of gusseted bags of different widths.

A still further object of this invention is to provide an apparatus for producing a gusseted multi-ply bag having a plastic inner liner which apparatus does not directly contact the portions of the plastic inner ply to form the V-shaped gussets therein.

The process of the present invention for forming a gusseted multi-ply bag includes the steps of advancing a web of sheet material adapted to be formed into the outer ply of the bag. A preformed tube of plastic material adapted to be formed into the plastic inner liner of the bag is advanced co-extensively with the web of sheet material. A portion of the preformed tube of plastic material is inflated with a gas. A part of the inflated portion of the preformed tube of plastic material is then partially flattened. The web of sheet material is then infolded to form a partially flattened tube around the partially flattened part of the inflated portion of the preformed tube of plastic material. Contact is established between the tube of sheet material and the preformed tube of plastic material at two oppositely disposed, longitudinally extending areas while maintaining separation of the tube of sheet material and the tube of plastic material in the area adjacent the two oppositely disposed, longitudinally extending areas. A gusset is formed in the tube of sheet material and the preformed tube of plastic material simultaneously along the two oppositely disposed, longitudinally extending areas. The gusseted tube of sheet material and the gusseted preformed tube of plastic material contained within the tube of sheet material are then flattened to form a length of bag forming stock.

The apparatus aspect of the present invention is exemplified by an apparatus for forming gusseted multi-ply bags which includes spaced apart means for pressing together opposed wall portions of a preformed tube of plastic material to provide an inflated section of the tube. Mandrel means is provided for shaping one or more paper webs and the preformed tube of plastic material into a length of gusseted multi-ply bag stock. The mandrel means includes a pair of upper blades and a pair of lower blades, the pairs of blades being spaced apart to receive the inflated section of the plastic tube and being adjustably mounted on support means for the blades whereby the position of each blade may be changed to permit production of gusseted bags having different widths. Means for infolding the one or more paper webs about the blades of the mandrel means to form a paper tube enveloping the preformed tube of plastic material is provided. Gusset forming means is provided which extends into the space between each of the upper and lower blades. Means is provided for moving the paper tube and the preformed tube of plastic material through the bag-forming apparatus.

The foregoing, and other objects, features and advantages of the present invention will be apparent from a consideration of the following specification taken in conjunction with the accompanying drawings in which like reference characters designate the same or similar parts through the several views.

Figure 1:
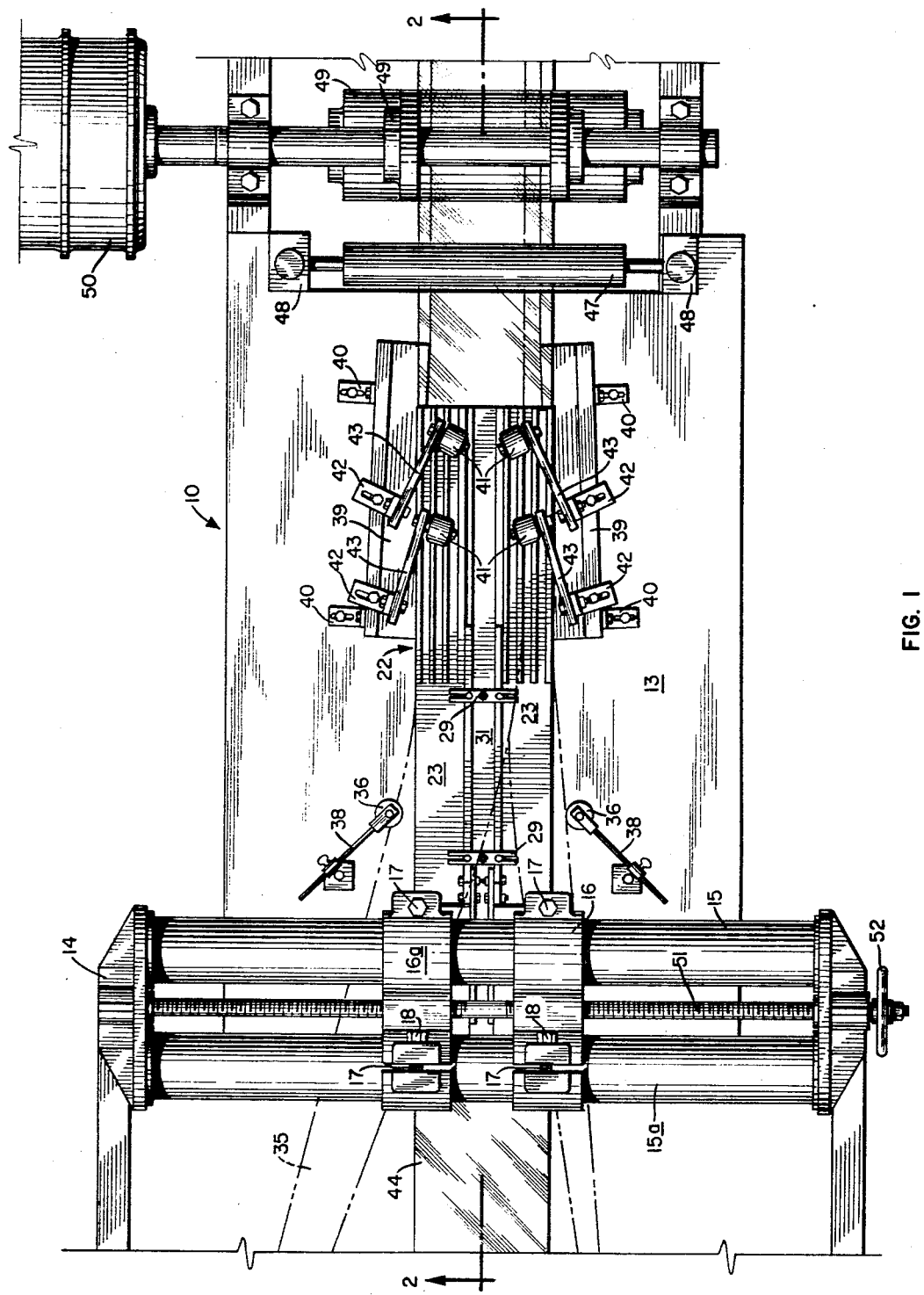
FIGURE 1 is a plan view of a portion of a bag-forming apparatus constructed in accordance with the present invention.
Figure 2:
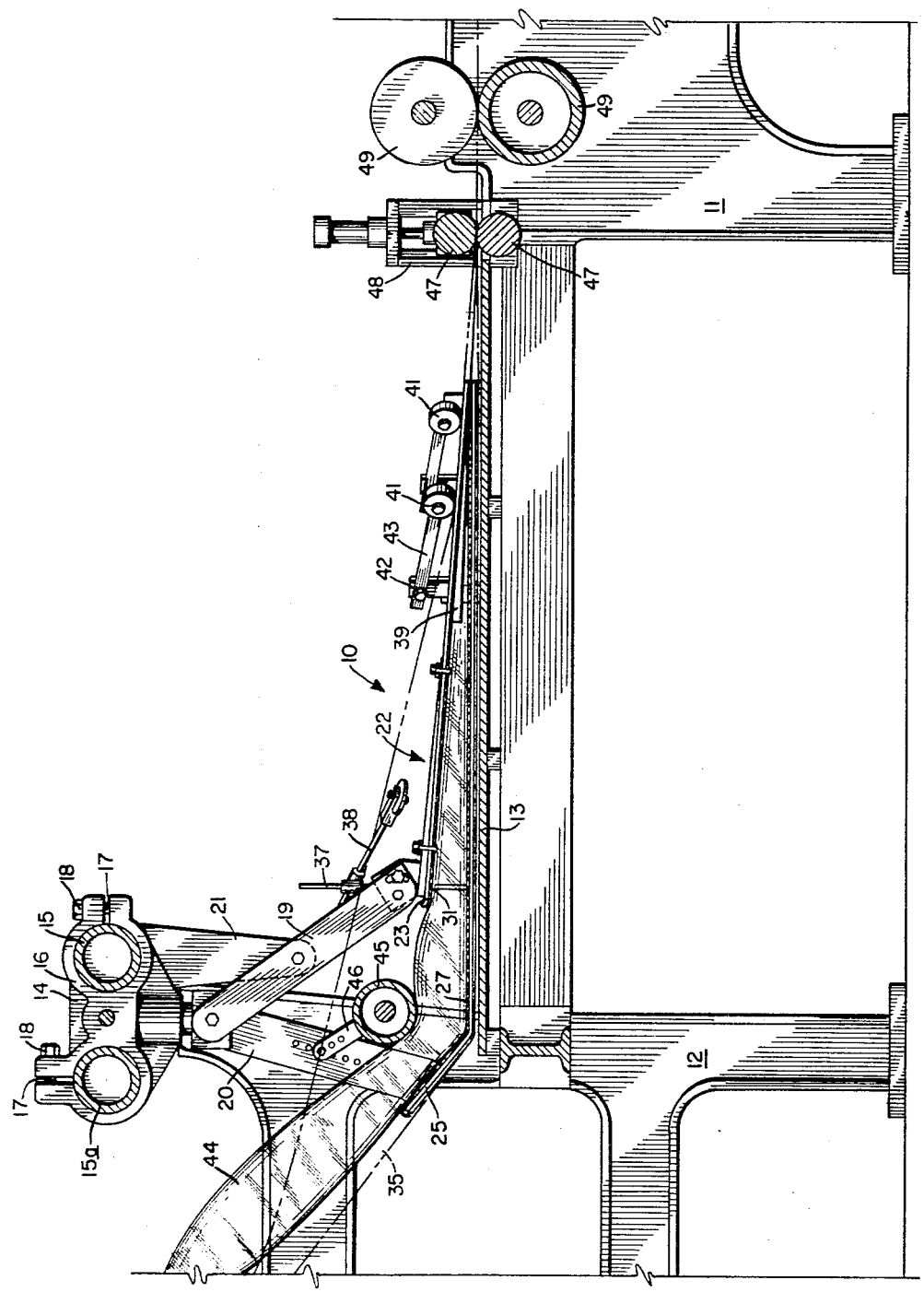
FIGURE 2 is a sectional elevational view of the apparatus of FIGURE 1 taken along line 2—2.

Referring now to FIGURES 1 and 2, a bag-forming apparatus constructed in accordance with the present invention is designated generally by the numeral 10. The apparatus 10 is adapted to receive one or more paper webs, or other bag-forming material, to fold the webs longitudinally into a tubular form and to adhesively secure the edges of each web one to the other. A preformed tube of plastic material is inflated and placed within the paper tube. Gusset skids act on the sides of the paper-plastic tube to produce gussets on the sides of the enveloped tubes. The tube stock is then delivered to a cutting mechanism which severs the nested tubed plies into discrete bag lengths.

As seen in FIGURE 2 the apparatus includes forward legs 11 and rearward legs 12 which support a forming table 13. A support bracket 14 is attached to the upper end of each of the rearward legs 12. Two cylindrical support members 15 and 15a are mounted between the two support brackets 14—14. Support sleeves 16 and 16a are slidably mounted on cylindrical support members 15 and 15a. Each support sleeve may be locked into position on the cylindrical support members by means of bolts 17 and nuts 18. Threaded rod 51 supported between brackets 14—14 has opposite thread directions on each half thereof. This rod passes through threaded bores in support sleeves 16 and 16a and when rotated by handwheel 52 quickly adjusts the transverse position of sleeves 16 and 16a with respect to each other. Each of the support sleeves 16 and 16a have depending therefrom two movable arms 19 and 20 (as may be more clearly seen in FIGURE 2). Each arm 19 is angularly positioned by attachment to depending support leg 21 each of which is attached to the respective support sleeve 16 or 16a.

Figure 3:
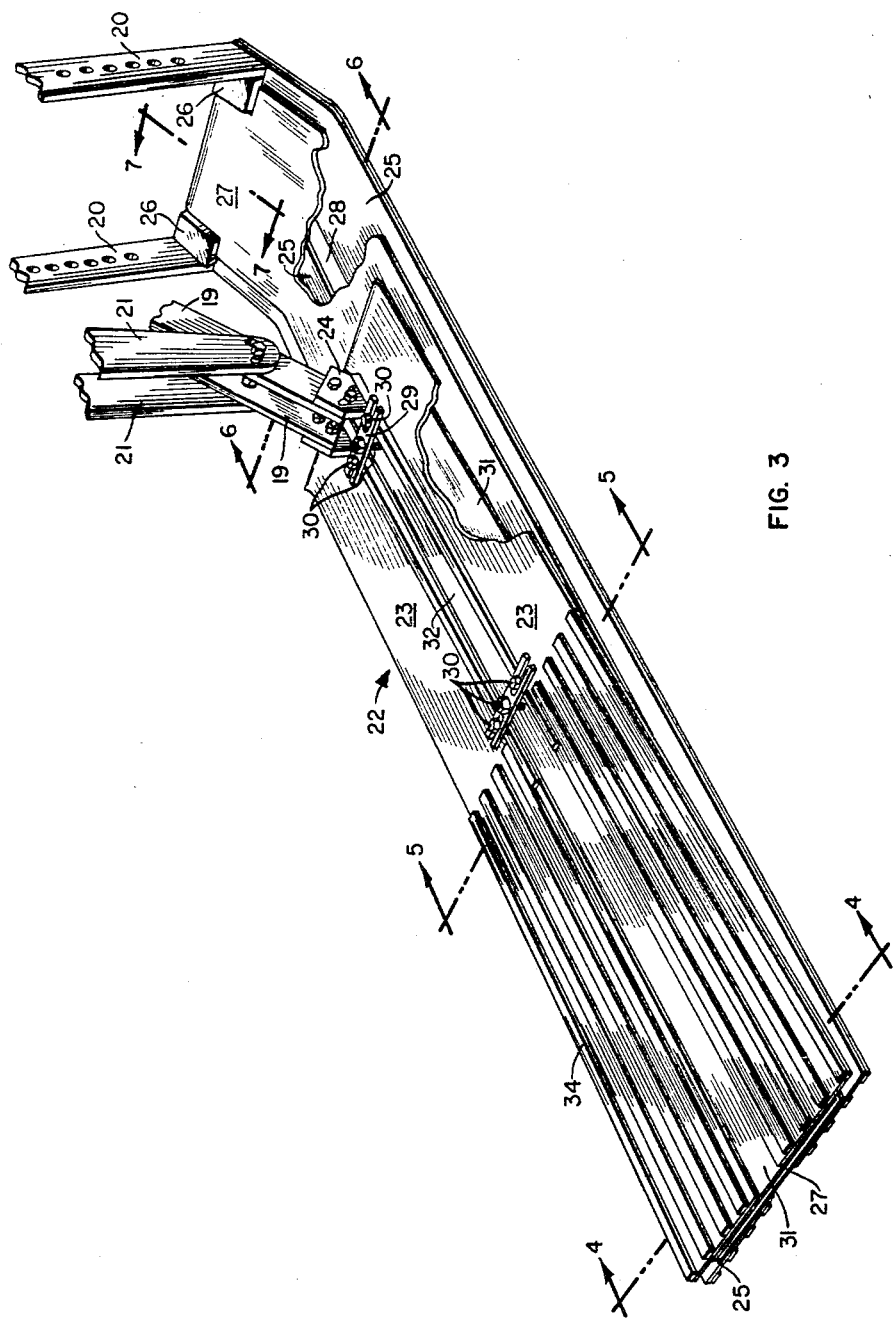
FIGURE 3 is a perspective view of a bag-forming mandrel constructed in accordance with the present invention.
Figure 4:
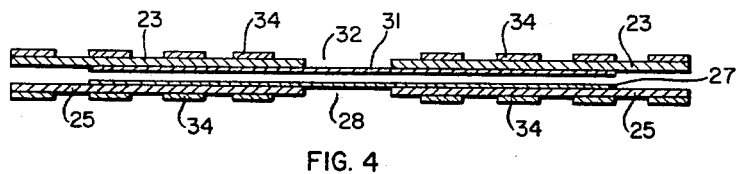
FIGURE 4 is a cross sectional view of the mandrel of FIGURE 3 taken along the line 4—4.

As can be more clearly seen in FIGURE 3, the spaced apart movable arms 19—19 and 20—20 provide the sole support means for the bag-forming mandrel designated generally by the numeral 22. The mandrel 22 includes a pair of oppositely disposed upper blade members 23—23 attached to movable arms 19—19 by means of brackets 24—24. Lower blade membres 25—25 ohrizontally positioned below upper blades 23—23 are supported by arms 20—20 which have their lower ends welded to reinforcing blocks 26—26 that are in turn welded to the lower blade members 25—25.

Figure 5:
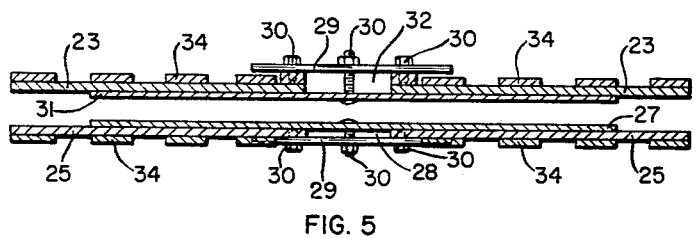
FIGURE 5 is a cross sectional view of the mandrel of FIGURE 3 taken along the line 5—5.
Figure 6:
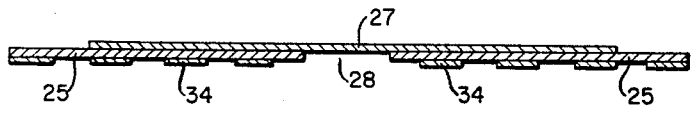
FIGURE 6 is a cross sectional view of the mandrel of FIGURE 3 taken along the line 6—6.

Referring now to FIGURES 3 through 7, it will be seen that a lower fillet plate 27 is positioned on the upper surface of spaced apart lower blades 25—25, but not fixedly attached thereto. The fillet plate 27 covers the opening 28 which normally exists between the two lower blades 25—25. As can be seen in FIGURE 5 the lower fillet plate 27 is held firmly to the upper surfaces of lower blades 25—25 by means of a slotted strap 29 and a series of bolts 30. Loosening the outer bolts 30—30 in the slotted strap permits the lower blades 25—25 to be transversely positioned with respect to each other by means of the adjustments made to support sleeves 16 and 16a using handwheel 52. The bolts are then locked into position to provide the desired rigidity to the upper blade members.

Figure 7:
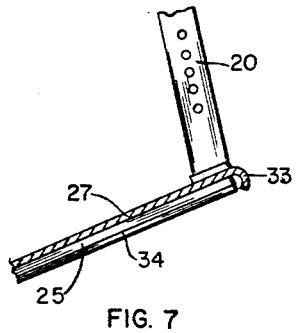
FIGURE 7 is a partial sectional view of the mandrel of FIGURE 3 taken along the line 7—7.

As can be seen in FIGURES 3 and 5 the upper blades 23—23 have their lower surfaces partially covered by an upper fillet plate 31. The upper fillet plate 31 normally covers the opening 32 which exists between the spaced apart upper blades 23—23. A pair of longitudinally spaced apart slotted straps 29—29 together with bolts 30—30 adjustably position the upper fillet plate 31 against the lower surfaces of the spaced apart upper blade members 23—23. As can be seen in FIGURE 7 the forward end of lower fillet plate 27 has a down-turned portion 33 which covers the forward end of the spaced apart lower blades 25—25. This prevents the fillet plate from snagging the inflated plastic tube used to provide the inner ply for the gusseted multi-ply bag.

It will be noted that the upper surfaces of the upper blade members 23—23 and the lower surfaces of the lower blade members 25—25 have longitudinally extending, spaced apart flat straps 34 fixedly mounted on their surfaces. The straps 34 are provided to hold the infolded paper web off of the surfaces of the upper and lower former blades in order to prevent the cross paste spots which have been applied to the innermost paper web from being wiped off as the web is infolded around the former 22. It should be noted that the configuration of the straps 34 is not to be limited to the flat straps depicted in the drawings. These straps may be in the form of half round or full round longitudinally extending wires or bars or any other suitable shape which will permit the cross paste spots from being wiped off the innermost paper web.

It should be noted that the former or mandrel 22 is supported above the forming table 13 and independently thereof solely by the support arms 19—19 and 20—20. As can be more clearly seen in FIGURE 2 it is necessary that the mandrel 22 be supported above the forming table in order to permit the one or more paper webs 35 to pass underneath the lower former blades 25—25 and then infolded around the lower former blades and upper blades to provide the tubed outer plies of the multi-ply bags. The paper web 35 (one or more) will be drawn from a conventional roll stand (not shown) located to the rear of the bag-forming apparatus 10. Each paper web will pass over conventional cross paster rollers (not shown) where there will be applied to each web a transverse line of dots of paste or either a transverse bar of paste at longitudinally spaced apart points which are slightly shorter than the length of the bag to be produced in order to adhere the separate plies to each other and to the plastic inner liner. Aidditionally the paper web 35 will be passed over a conventional longitudinal paster (not shown) where a band of adhesive will be placed along one edge of each of the paper plies, and the plies will be arranged in the conventional offset relationship for infolding into a multiply gusseted bag. The prepasted aligned paper plies 35 pass from the head roll stand (not shown) down underneath the up-turned or heel end of the lower blade members 25—25 and are held in tight engagement therewith. The paper webs 35 are then infolded around the upper and lower blade members as can be seen in dotted outline in FIGURES 1 and 2. The opposed marginal longitudinal edges of the paper plies are brought together and the longitudinal adhesive present on each edge unites the overlapping edges to form a tubed assembly containing one or more plies of nested paper tubes.

As can be seen in FIGURES 1 and 2 a wheel 36 is rotatably mounted on table 13 on either side of the mandrel 22 by means of vertical arm 37 and transverse arm 38. These wheels break the webs up and over the mandrel 22 to infold the tubes into nested tubular plies. A gusset skid 39 is mounted on either side of the mandrel 22 and extends between each pair of upper and lower blade members 23-25. Each skid is generally rectangular in shape and is positioned to force the nested paper webs firmly into a V-shaped projection which extends between the upper and lower blades 23-25 on either of the former to produce the V-shaped gussets in both the nested paper webs and the preformed plastic inner ply. Each gusset skid 39 is adjustably attached to the forming table 13 by means of L-brackets 40. Two sets of ironing rollers 41—41 are adjustably mounted on the reinforced edge of the gusset skids by means of L-brackets 42 and attached arms 43. These ironing rollers are set at an angle to the direction of travel of the nested paper tubes in order to push the paper plies tightly around the exterior surface of the former 22. This keeps the longitudinal edges of the webs from sliding transversely after they are lapped along the portion having the adhesive thereon which forms the longitudinal seams of the bag stock.

A preformed tube of thermoplastic material 44 is utilized to form the inner ply of the multi-wall paper bag. The preformed plastic tube may be a relatively thin wall flexible seamless plastic tube as produced by a cylindrical die assembly in use in current production of thin wall, lay flat plastic tubing. Also the preformed tube may be made by longitudinally heat sealing or adhesively sealing a flat web of thermoplastic sheet material into a preformed tube. If desired the preformed tube can be formed from a flat web of thermoplastic material by enveloping the web into a tube and subsequently heat sealing in a continuous operation in suitable apparatus positioned at the rear of the multi-wall bag-forming apparatus shown in FIGURES 1 and 2. The preformed plastic tube will pass through a forward pair of pinch rollers (exemplary forms of which are shown in my aforementioned patent applications). These rollers together with the set of rearward squeeze rollers 47—47 serve to entrap a bubble of air in the length of plastic tubing which passes through the mandrel portion of the bag-forming apparatus as depicted in FIGURES 1 and 2 of the drawings. The inflated portion of the preformed plastic tubing 44 passes under a flattening roller 45 adjustably mounted between arms 20—20 by means of brackets 46—46. The flattening roller 45 serves to partially flatten the inflated portion of the preformed plastic tubing 44 in order that it will enter the space between the upper and lower blade members of the former 22, as can be more clearly seen in FIGURE 2 without snagging. The inflated portion of the plastic tube 44 passes between the upper blade members 23—23 and the lower blade members 25—25 and due to the decreasing spacing between the respective upper and lower blade members as can be seen in FIGURE 2, the inflated part of the plastic tube is decreased in thickness as it progresses through the length of the mandrel 22. As described hereinbefore the outer paper webs 35 are infolded around the mandrel 22 and the gusset skids 39—39 produce infolded V-shaped gussets in the side of the paper webs. The infolded V-shaped gussets in the paper webs push into the inflated plastic tube inside the mandrel and conform the side portions of the inflated interior portion of the plastic tube 44 to the shape of the V-shaped gussets formed in the outer paper plies. Since the mandrel 22 of the present invention has no solid side portions this permits a friction free intimate direct contact between the moving paper webs 35 and the inflated plastic inner liner 44 over the longitudinally extending side portions wherein the gussets are formed. Thus the apparatus and method of the present invention provides a rapid friction-free method of forming a bag having a full conformance of plastic inner liner with the outer paper plies.

At the right hand end of the apparatus depicted in FIGURES 1 and 2 there is provided a rearward pair of squeeze rollers 47—47 adjustably mounted in support brackets 48—48. These rollers firmly press the layers of nested paper tubes and the wall of the plastic tube together to provide a substantially air tight seal in this end of the plastic tube thereby to maintain an inflated portion between this set of squeeze rollers and those at the entrance of the bag-forming apparatus. A pair of drive rollers 49—49 receive the flattened paper tube length therebetween and pull the flattened tube through the bag-forming apparatus 10. A drive mechanism 50 provides the power to rotate rollers 49—49 to pull the paper webs and plastic tube through the bag-forming apparatus.

It will be understood that after passing through drive rollers 49—49 the longitudinally extending length of bag stock will pass between conventional rotating or reciprocating cutting mechanisms to separate the gusseted length of nested paper and plastic tubing into conventional bag lengths. The separate bag lengths thus formed may then be fed to a heat sealing machine if desired to provide a hermetic seal in the tubular ply of plastic material at one or both ends of the bag. The bag lengths thus formed may then pass through a glueing device or a sewing machine where the end of the paper plies are closed. The foregoing steps may be reversed if desired. It will be understood that the process and apparatus of the present invention will produce multi-ply gusseted bags having a plastic inner liner as one ply thereof which may be heat sealed or be left unsealed and closed only by thread stitching or a suitably applied adhesive. Suitable apparatus for heat sealing and sewing to close one or both ends of the bag lengths is described in U.S. Patent 3,097,618, the disclosure of which is incorporated herein by reference. It is to be understood that the process and apparatus of the present invention may be utilized to provide lengths of bag stock which may be closed on one end by any suitable means and have provided on the other end thereof a suitable valve mechanism for filling the bag after it is closed on the other hand.

It will be seen that the process and apparatus provided in the present invention permits a quick and economical setup of a multi-wall bag-forming machine to produce a multi-wall bag of a specified size. The adjustability of the upper and lower gusset blades provides a bag-forming apparatus which can be quickly converted to producing bags a different width in a very short length of time. The fact that the bag-forming apparatus of the present invention utilizes a mandrel which has no rigid V-shaped side portions therein provides a device which imposes less frictional strain and scoring on the inflated plastic inner liner and thus provides a bag having a stronger inner ply. Because of the absence of the rigid metal V-shaped side portions which were present in the mandrel used heretofore the mandrel of the present invention produces less frictional drag on the plastic tubing moving through the mandrel 22. This permits a higher speed for the paper and plastic moving through the bag-forming apparatus and consequently an increase in the productive rate of the muti-wall bags being produced. Thus the process and apparatus of the present invention permit the manufacturer of gusseted multi-wall bags having a plastic inner liner at a lower cost than has been available heretofore.

The preformed plastic tube utilized in the apparatus and process of the present invention may be made from any suitable thermoplastic material. A preferred plastic material is polyethylene, however any flexible thermoplastic can be used which can be formed into a tube. Suitable thicknesses for the preformed tube are from about ½ to about 2½ mils thickness. However, lesser or greater thicknesses may be used if desired.

The disclosures and descriptions set forth in my copending applications Ser. No. 454,903 filed May 11, 1965, now Patent No. 3,291,375, issued Dec. 13, 1966, and Ser. No. 558,182 filed Apr. 28, 1966 are hereby incorporated into the disclosure of the present application by reference.

While there has been described what is at present considered preferred embodiments of the present invention, it will be apparent to those skilled in the art that various modifications and changes may be made without departing from the essence of the invention. It is intended to cover herein all such modifications and changes as come within the true scope and spirit of the claims.

What is claimed is:

1. In a process for forming a gusseted multi-ply bag the steps of:
  (a) advancing a web of sheet material adapted to be formed into the outer ply of said bag;
  (b) advancing a preformed tube of plastic material adapted to be formed into the plastic inner liner of said bag co-extensively with said web of sheet material;
  (c) maintaining a portion of said preformed tube of plastic material inflated with a gas;
  (d) partilly flattening a part of said inflated portion of said preformed tube of plastic material;
  (e) infolding said web of sheet material to form a partially flattened tube around said partially flattened part of said inflated portion of said preformed tube of plastic material;
  (f) establishing contact between said tube of sheet material and said preformed tube of plastic material at two oppositely disposed longitudinally extending areas while maintaining substantial separation of said tube of sheet material and said tube of plastic material in the area adjacent said two oppositely disposed, longitudinally extending areas;

(g) forming a gusset in said tube of sheet material and said preformed tube of plastic material simultaneously along said two oppositely disposed, longitudinally extending areas; and (h) flattening said gusseted tube of sheet material and said gusseted preformed tube of plastic material contained within said tube of sheet material to form a length of bag-forming stock.

2. The process of claim 1 for forming a gusseted multi-ply bag including the additional steps of:

(a) severing said length of bag-forming stock into bag lengths; and (b) closing at least one end of each of said bag lengths to form a gusseted multi-ply bag.

3. The process of claim 1 for forming a gusseted multi-ply bag including the additional steps of:

(a) severing said length of bag-forming stock into bag lengths;

(b) closing at least one end of said preformed tube of plastic material forming said plastic inner liner by heat sealing; and (c) closing the same end of said tube of sheet material adjacent to but below the heat sealed end of said plastic inner liner by means of a line of thread stitching.

4. The process set forth in claim 1 wherein a plurality of paper webs are used to form the outer plies of the gusseted multi-ply bag.

5. The process of claim 1 for forming a gusseted multi-ply bag including the additional step of progressively increasing the depth of the gusset formed in said tube of sheet material and said preformed tube of plastic material prior to flattening of said gusseted tubes.

6. In an apparatus for forming gusseted multi-ply bags, the combination comprising:

(a) spaced apart means for pressing together opposed wall portions of a preformed tube of plastic material to provide an inflated section of said tube;

(b) mandrel means for shaping one or more paper webs and said preformed tube of plastic material into a length of gusseted multi-ply bag stock, (i) said mandrel means including a pair of upper blades and a pair of lower blades, said pairs of blades being spaced apart to receive said inflated section of said plastic tube and being adjustably mounted on support means for said blades whereby the position of each blade may be changed to permit production of gusseted bags having different widths;

(c) means for infolding said one or more paper webs about said blades of said mandrel means to form a paper tube enveloping said preformed tube of plastic material;

(d) gusset forming means extending into the space between each of said upper and lower blades; and (e) means for moving said paper tube and said tube of preformed plastic material through the bag-forming apparatus.

7. The apparatus as defined in claim 6 wherein the upper surface of said upper blades and the lower surface of said lower blades have spaced apart, longitudinally extended ribs thereon.

8. The apparatus as defined in claim 6 wherein said upper blades are inclined with respect to said lower blades.

9. The apparatus as defined in claim 6 wherein said upper blades are adjustably joined to each other and said lower blades are adjustably joined to each other by means of a fillet member.

10. The apparatus as defined in claim 6 wherein said pair of upper blades are mounted independently of said pair of lower blades.

References Cited

UNITED STATES PATENTS

| 3,183,797 | 5/1965 | Boone | 93—35 XR |
| 3,291,007 | 12/1966 | McDowell | 93—20 |
| 3,336,846 | 8/1967 | Berghgracht | 93—20 XR |

BERNARD STICKNEY, *Primary Examiner.*